United States Patent [19]
Asano et al.

[11] Patent Number: 5,379,871
[45] Date of Patent: Jan. 10, 1995

[54] SHIFT LEVER APPARATUS

[75] Inventors: Yasushi Asano; Norio Togano, both of Kosai; Shunsuke Ikushima, Kawasaki, all of Japan

[73] Assignees: Fujikiko Kabushiki Kaisha, Tokyo; Nissan Motor Co., Ltd., Kanagawa, both of Japan

[21] Appl. No.: 97,287

[22] Filed: Jul. 26, 1993

[30] Foreign Application Priority Data

Jul. 28, 1992 [JP] Japan .................................. 4-201539

[51] Int. Cl.⁶ .............................................. B60K 41/26
[52] U.S. Cl. ................................ 192/4 A; 74/483 R; 192/4 C
[58] Field of Search ................ 192/4 A, 4 R, 4 C; 74/483 R; 180/271

[56] References Cited

U.S. PATENT DOCUMENTS

| | | | |
|---|---|---|---|
| 4,821,605 | 4/1989 | Dzioba | 192/4 A X |
| 4,887,702 | 12/1989 | Ratke et al. | 192/4 A |
| 4,905,802 | 3/1990 | Gotoh | 192/4 A |
| 4,967,883 | 11/1990 | Kito et al. | 192/4 A |
| 4,991,700 | 12/1991 | Koga | 192/4 A |
| 5,016,738 | 5/1991 | Shirahama et al. | 192/4 A |
| 5,062,509 | 11/1991 | Carpenter et al. | 192/4 A |
| 5,129,494 | 7/1992 | Rolinski et al. | 192/4 A |
| 5,133,222 | 7/1992 | Hansson | 192/4 A X |
| 5,150,593 | 9/1992 | Kobayashi et al. | 192/4 A X |
| 5,293,763 | 3/1994 | Asano et al. | 192/4 A X |
| 5,309,744 | 5/1994 | Kito et al. | 192/4 A X |

FOREIGN PATENT DOCUMENTS 60-135352  1/1983  Japan .

*Primary Examiner*—Andrea L. Pitts
*Attorney, Agent, or Firm*—Hopkins & Thomas

[57] ABSTRACT

A shift lever apparatus for an automatic transmission includes a pin-lock member which can be positioned at a pin-lock position for preventing the positioning pin positioned at the parking position from moving, and a restrict member which can be positioned at a restrict position for preventing the pin-lock member positioned at the pin-lock position from moving. A control device is provided for positioning the pin-lock member at the pin-lock position and for positioning the restrict member at the restrict position when the positioning pin is positioned at the parking position.

9 Claims, 5 Drawing Sheets

SHIFT LEVER APPARATUS

BACKGROUND OF THE INVENTION

The present invention relates to a shift lever apparatus, and more particularly, to a shift lever apparatus provided in a vehicle with an automatic transmission.

A shift lever apparatus has been disclosed in the Japanese Patent Application Laid Open No. 60-135352. In this shift lever apparatus, when a positioning pin arranged on a shift lever is positioned at a parking position in a positioning plate, a notch of a bell-crank rotatably secured on the positioning plate engages with a positioning pin so as to restrict the movement of the positioning pin. The bell-crank is connected by a transmission member such as a cable to a key rotor of a cylinder lock which has the function of releasing a locked steering.

In the above-described shift lever apparatus, however, in a steering-lock state in which the engine key is removed from the key rotor, if a user tries to move the positioning pin positioned at the parking position downwards or toward the other positions while pressing a knob button provided in the shift lever, the force to move the positioning pin downwards is transmitted to the bell-crank to rotate the bell-crank and thus the force is also transmitted to the cable. In this situation, the cable may be stretched too tightly, whereby the tension in the cable may cause damage to the cable or the other transmission members connecting the bell-crank to the cylinder lock. Further, if the cable is lengthened, there is a concern that a lock in the cylinder lock may be released.

SUMMARY OF THE INVENTION

In view of the above, an object of the present invention is to solve the aforementioned problems in the prior art through the introduction of a shift lever apparatus which can prevent any force, caused by an attempt to shift the shift lever in a state in which a positioning pin arranged on a shift lever is positioned at a parking position, from being transmitted to a transmission member, such as a cable. The above-mentioned object of the present invention is accomplished through a shift lever apparatus comprising: a positioning plate with a parking position and a running position; a shift lever pivotally supported on a vehicle body; a positioning pin arranged on the shift lever, the positioning pin being movable between the parking position and a running position; a pin-lock member positionable at a pin-lock position and a pin-lock release position, the pin-lock position being set to restrict the movement of the positioning pin positioned at the parking position and the pin-lock release position being set to allow the positioning pin to move freely; a restrict member positionable at a restrict position set to prevent the pin-lock member from moving from the pin-lock position toward the pin-lock release position; and a controller for positioning the pin-lock member at the pin-lock position and for positioning the restrict member at the restrict position when the positioning pin is positioned at the parking position.

In a preferred embodiment of a shift lever apparatus according to the present invention, the restrict member is pivotally supported by a first shaft, is energized in a first direction by a first energizing member, and is pressed by the positioning pin while rotating in a second direction opposite to the first direction to be positioned at the restrict position when the positioning pin is positioned at the parking position. In addition, the controller includes a switch part and an actuator, the switch part being turned on by the restrict member when the positioning pin moves from the running position toward the parking position and the restrict member is positioned at the restrict position. The actuator is connected to the pin-lock member and serves to position the pin-lock member at the pin-lock position when the switch part is turned on.

In the above-described lever switch, when the positioning pin is positioned at the parking position, since the controller serves to position the pin-lock member at the pin-lock position and to position the restrict member at the restrict position, the positioning pin is prevented from moving by the pin-lock member even if the user tries to move the positioning pin downwards or toward the running position. Accordingly, when the positioning pin is positioned at the parking position, the force applied to move the positioning pin is transmitted only to the pin-lock member without being transmitted to the other members.

BRIEF DESCRIPTION OF THE DRAWINGS

An embodiment of the present invention will now be described in detail with reference to the accompanying drawings in which.

DETAILED DESCRIPTION OF THE PREFERRED EMBODIMENTS

A shift lever apparatus according to the present invention will be described hereinafter with reference to FIGS. 1–5. The below-described right and left sides or directions, the upward and downward directions, and the clockwise and counterclockwise directions correspond, respectively, to the right and left sides or directions, the upward and downward directions, and the clockwise and counterclockwise directions in FIGS. 1, 3, 4, and 5.

Figure 1:
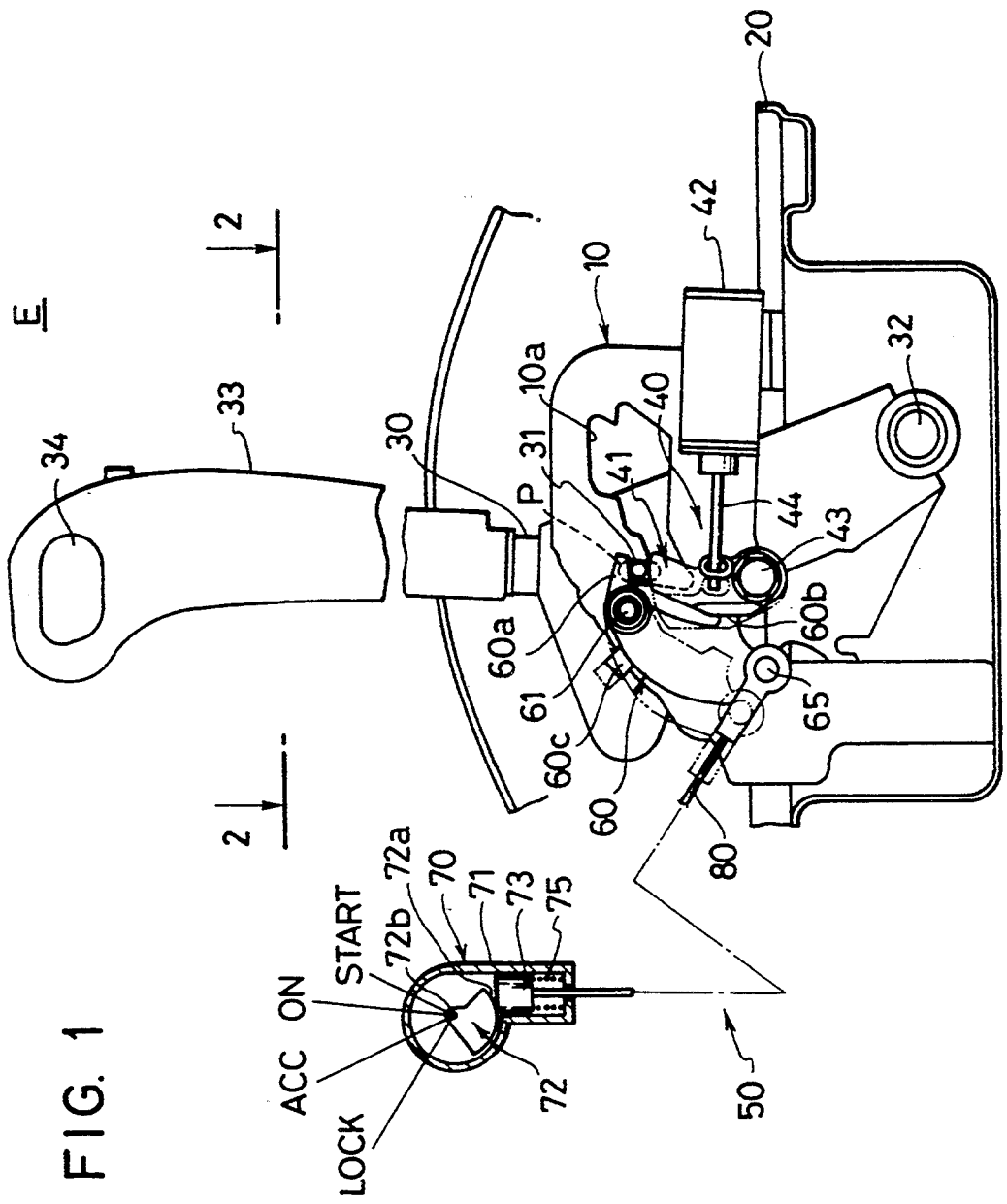
FIG. 1 is a partially cutaway explanatory plan view of a shift lever apparatus according to the present invention.
Figure 2:
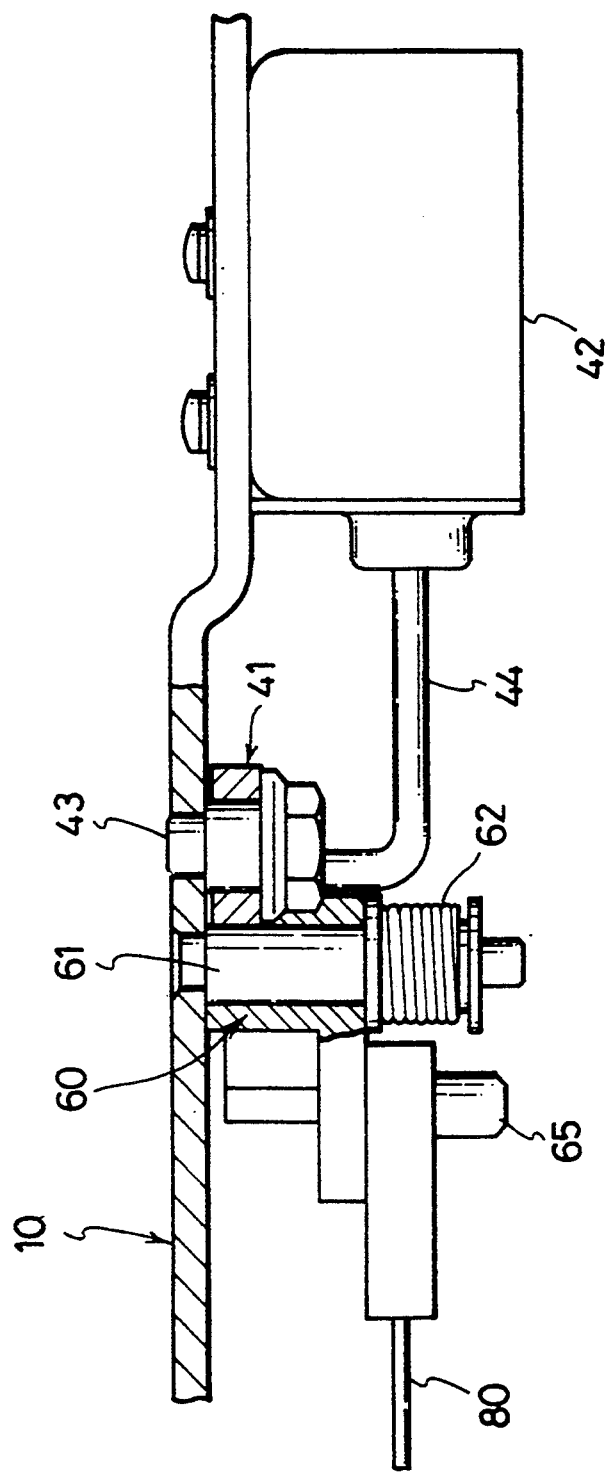
FIG. 2 is a partly broken away, enlarged explanatory view taken along the line 2—2 in FIG. 1.

In FIG. 1, a shift lever apparatus E is used with an automatic transmission in a vehicle. A positioning plate 10 is arranged on a machine casing 20 which is secured to the vehicle body. The positioning plate 10 is formed with an opening 10a having a plurality of positioning recesses relatively adjacent to the outer periphery thereof. The positioning recesses correspond to parking (P), reverse, neutral, drive, second-speed, and first-speed positions, respectively. The parking position (P) is located at the leftmost side of the opening 10a as shown in FIG. 1. In the following, the above-mentioned positions in the opening 10a except the parking position (P) will be referred to as running positions.

The base portion of a shift lever 30 is pivotally supported on the machine casing 20 by a shaft 32. The positioning pin 31 is partly embedded in a rod (not shown) which is slidably arranged inside the shift lever 30 and which is energized upwards by a rod spring (not shown) at all times. A knob 33 is secured to the upper end of the shift lever 30 and is provided with a knob button 34 which partly protrudes from the knob 33 and can be pressed toward the inside of the knob 33. When a manual downward force is applied to the knob 33 while the knob button 34 is pressed, the positioning pin 31 can be urged downwards.

A shift-lock lever 41 is pivotally supported by a shaft 43 on the bottom side of the positioning plate 10. The shift-lock lever 41 has a lock portion 41a; and when the positioning pin 31 is positioned at the parking position (P), the lock portion 41a of the shift lock lever 41 is positioned right under the positioning pin 31 and can prevent the positioning pin 31 from moving downward.

An actuator, for example, a solenoid 42 with a plunger 44, is secured to the positioning plate 10. The plunger 44 which is partly contained inside the solenoid 42 is energized by a spring 42a inside the solenoid 42 so as to exit the solenoid 42 in the direction shown by an arrow A in FIG. 5. The outside end of the plunger 44 is secured to an engaging hole 41b which is formed in the shift-lock lever 41. When the solenoid 42 is turned on or is excited so that the plunger 44 enters the solenoid 42, the shift-lock lever 41 can rotate in the clockwise direction, whereby the lock portion 41a can be located at the right under the positioning pin 31 positioned at the parking position (P). A sensor 92 is provided around a brake pedal 91 so as to sense whether or not the brake pedal 91 is pressed and to produce the signal. Specifically, a sensor 92 provides a signal so that when starting the engine in the vehicle and when a brake pedal 91 is pressed in order to release the positioning pin 31 from the parking position (P), the solenoid 42 is de-energized, i.e., is in an off state. The shift-lock lever 41 is constructed so that in the above-described situation when the shift-lock lever 41 rotates in the counterclockwise direction, the lock portion 41a is withdrawn from the position directly under the positioning pin 31.

Figure 3:
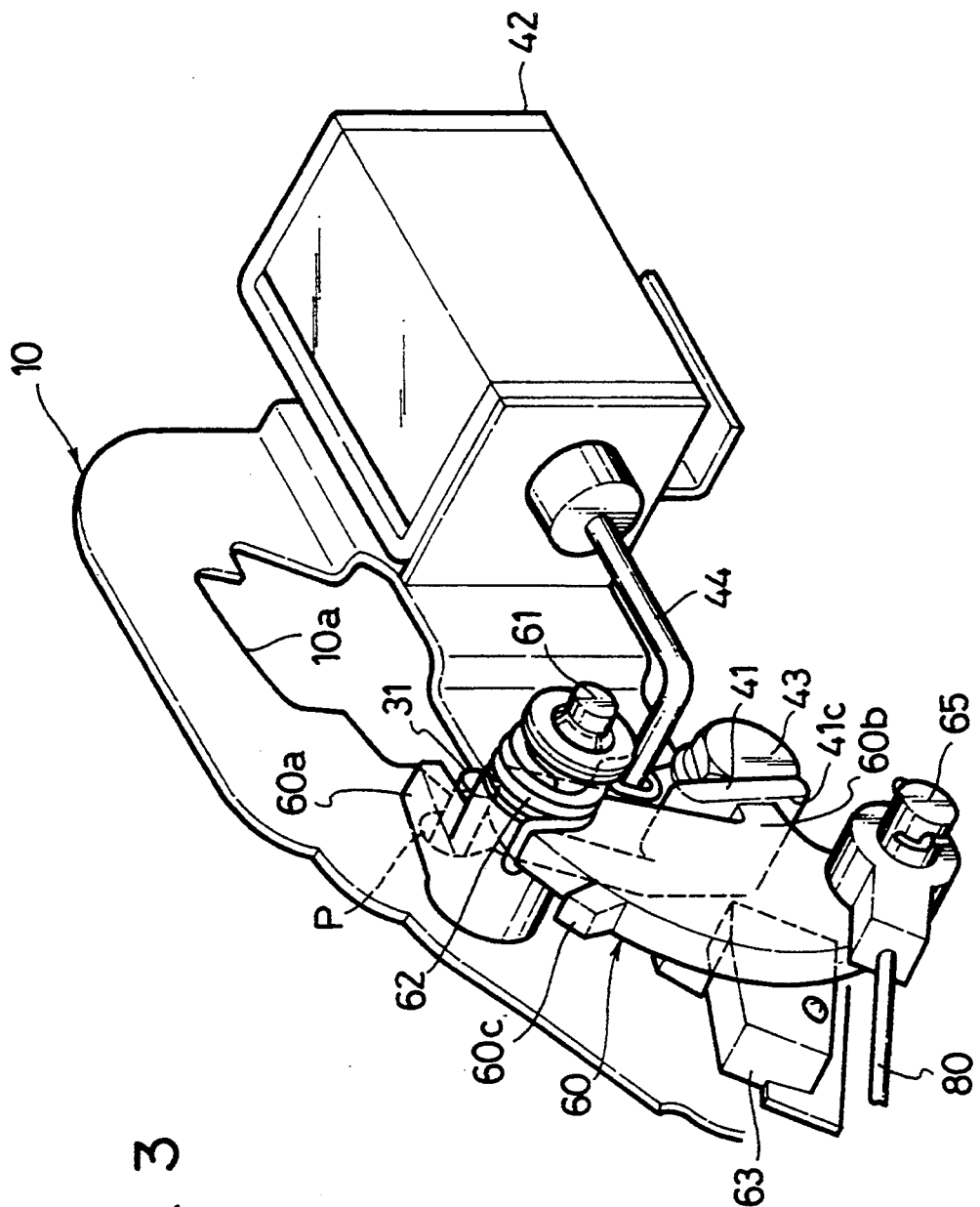
FIG. 3 is an explanatory perspective view of a part of the shift lever apparatus shown in FIG. 1.

A key-lock lever 60 with a bell-crank shape provided with an upper part 60a and a bottom part is pivotally supported on the positioning plate 10 by a shaft 61. The key-lock lever 60 is energized by a helical torsion spring 62 wound around the shaft 61 so as to rotate in the clockwise direction. The force of the helical torsion spring 62 is set greater than that of the spring 42a of the solenoid 42. The lower end of the upper part 60a of the key-lock lever 60 can abut against the positioning pin 31 positioned at the parking position (P). The right and left sides of the bottom part of the key-lock lever 60, respectively, have integrally formed projections 60b, 60c. respectively. The projection 60b can abut against the left end (hereinafter back side face) 41c of the shift-lock lever 41. The projection 60c can abut against a microswitch 63 provided behind the key-lock lever 60 as shown in FIG. 3. When the positioning pin 31 is moved into the parking position (P) for parking the vehicle and then the key-lock lever 60 is rotated in the counterclockwise direction, the projection 60c contacts and turns on the contact point of the microswitch 63, so that the solenoid 42 is energized. The bottom end of the bottom part of the key-lock lever 60 is connected to the end of a cable 80 by a securing shaft 65.

A cylinder lock 70 secured to a steering column includes a key cylinder 71 containing a key rotor 72 into which an engine key (not shown) is inserted and rotated. The key rotor 72 is rotatable to a lock position (LOCK) for locking the steering of the vehicle, an accessary position (ACC) for enabling use of electrical equipment in the vehicle with the engine stopped, an on position (ON) for operation of the engine, and a start position (START) for starting the engine.

Figure 4:
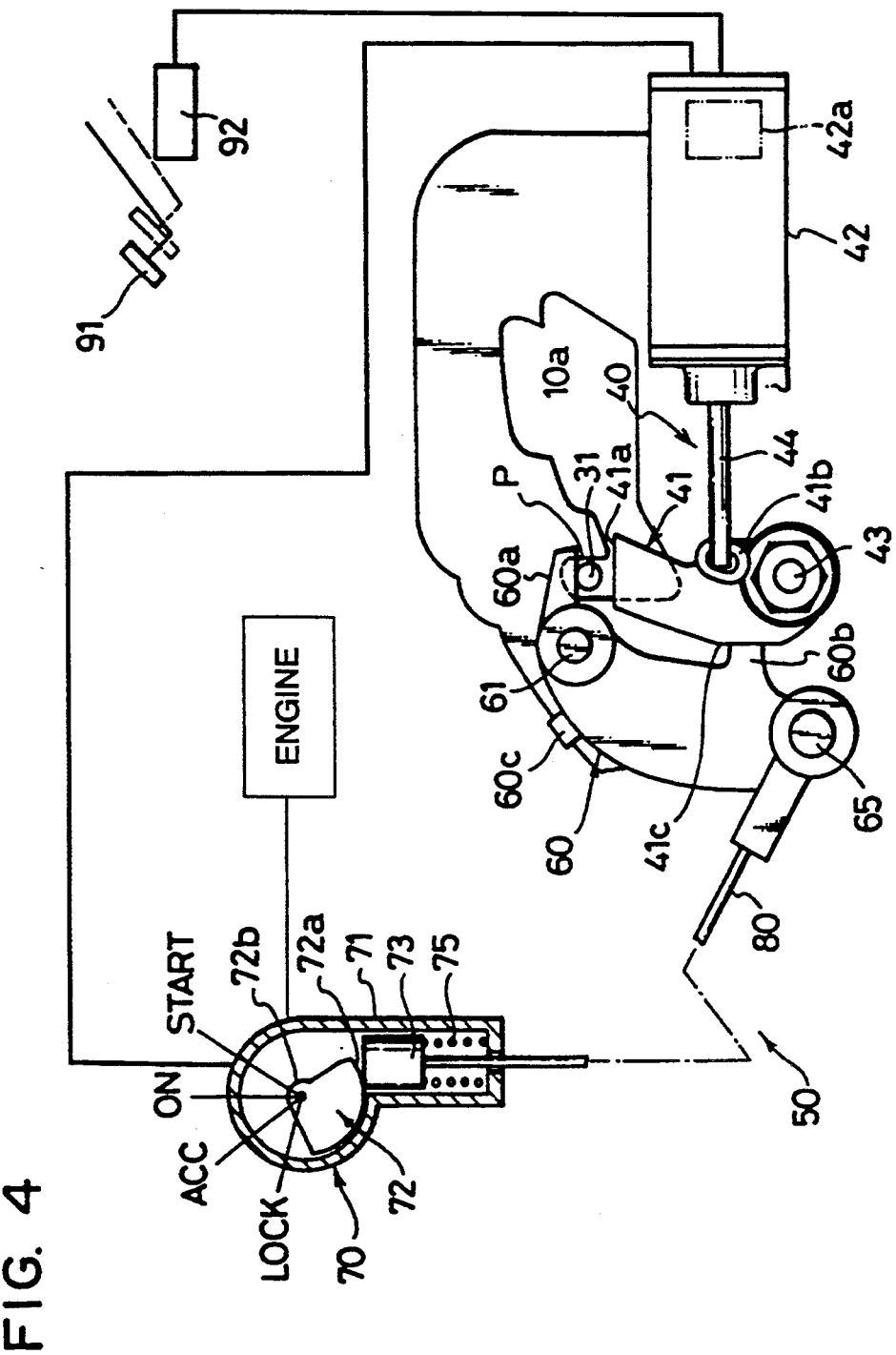
FIG. 4 is an explanatory view showing the state in which a positioning pin is locked.
Figure 5:
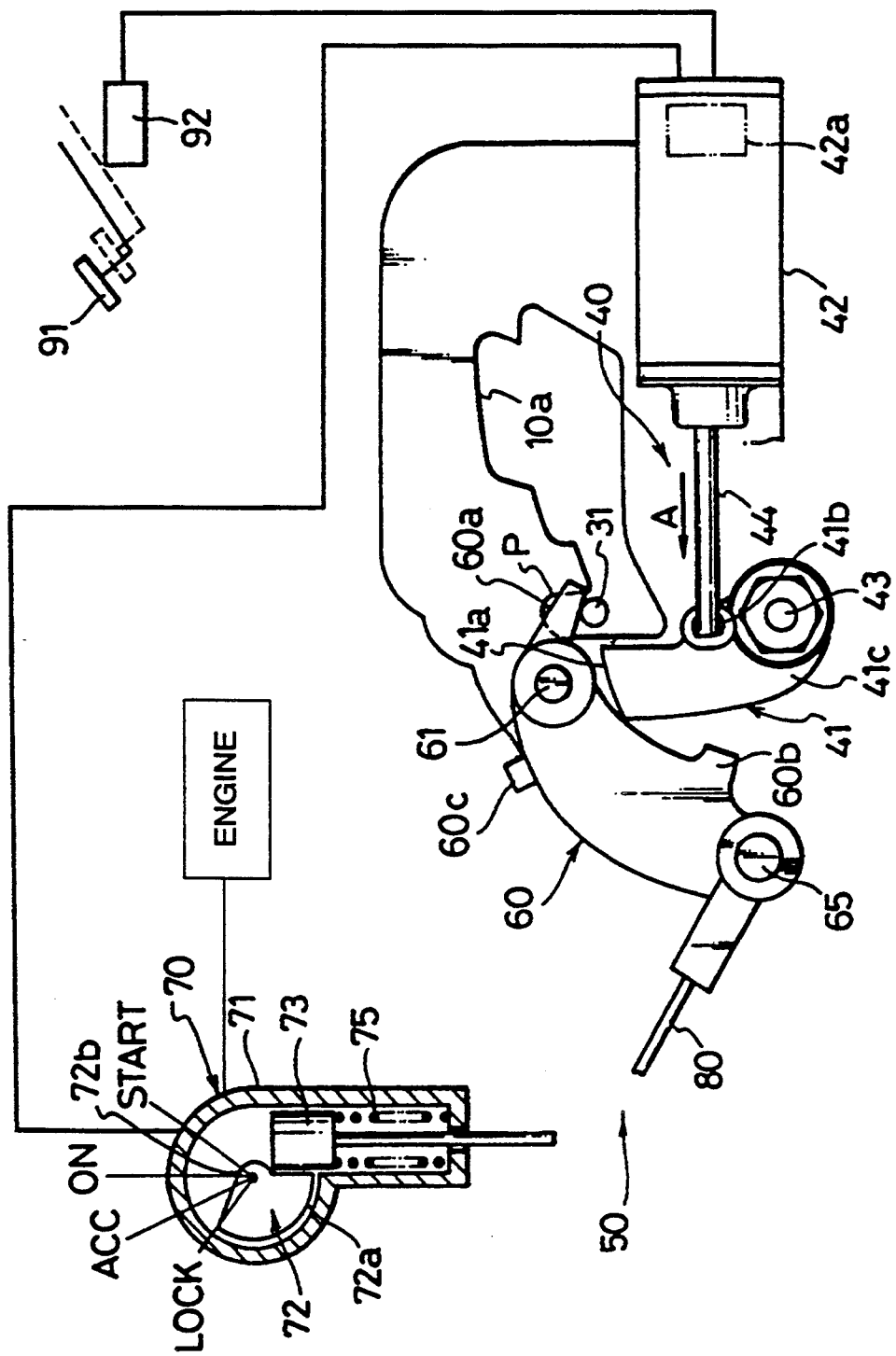
FIG. 5 is an explanatory view showing the state in which the positioning pin shown in FIG. 4 is unlocked.

The key cylinder 71 is provided thereinside with a stopper 73 which is connected to the key-lock lever 60 through the cable 80. The stopper 73 can be moved deeply inside of the key cylinder 71 by a tension spring 75 and can be positioned at a lock position set for preventing the key rotor 72 from moving from the on position (ON) toward the lock position (LOCK) as shown in FIG. 5. When the shift-lock lever 41 is positioned immediately under the positioning pin 31 positioned at the parking position (P) to prevent the positioning pin 31 from moving downward, the stopper 73 can move downwards to an unlock position for allowing the key rotor 72 to freely rotate as shown in FIG. 4. Specifically, in this situation, since the key-lock lever 60 is rotated in the counterclockwise direction thereby pulling the stopper 73 through the cable 80, the stopper 73 can move to the unlock position while resisting the force of the tension spring 75.

The key rotor 72 is provided with a restrict portion 72a which prevents the stopper 73 from moving toward the lock position from the unlock position of the stopper 73 when the key rotor 72 is rotated to the lock position (LOCK) as shown in FIG. 4. Further, the key rotor 72 is provided with a position-restrict portion 72b which, when the stopper 73 is positioned at its lock position, prevents the stopper 73 from further moving beyond its lock position as shown in FIG. 5. The sum of the forces of the helical torsion spring 62 and the tension spring 75 is smaller than that of the rod spring energizing the positioning pin 31 upwards.

Next, the operation and effect of this embodiment will be explained hereinafter.

During the parking period in which the shift lever 30 is shifted so that the positioning pin 31 is positioned at the parking position (P) and the engine key is removed from the cylinder lock 70, the key-lock lever 60 is pressed against the positioning pin 31 as shown in FIG. 4. Since in this state, the solenoid 42 is turned off, the shift-lock lever 41 tries to rotate in the counterclockwise direction from the action of the plunger 44 which is energized toward the shift-lock lever 41. However, since the back side face 41c of the shift-lock lever 41 is pressed by the projection 60b of the key-lock lever 60, the shift lever 41 is prevented from rotating, whereby the lock portion 41a is positioned immediately under the positioning pin 31 positioned at the parking position (P). The stopper 73 is positioned at its lock position while being pulled by the cable 80 connecting the stopper 73 and the key-lock lever 60.

In this state, even if the user tries to move the positioning pin 31 downwards while pressing the knob button 34 in order to release the lock state of the shift lever 30, the positioning pin 31, which is abutting against the lock portion 41a of the shift-lock lever 41, is prevented from moving and cannot be shifted from the parking position (P) toward the running position.

Accordingly, the force to move the positioning pin 31 is transmitted only to the shift-lock lever 41 and is not transmitted to the cable or to any members transmitting force produced around the positioning pin 31 toward the cylinder lock 70. Therefore, the cable 80 is prevented from being extended and the transmitting members from being damaged.

The operation, in which the engine key is inserted into the cylinder lock 70 and is rotated toward the on position (ON) to start driving, energizes the solenoid 42 and the restrict portion 72a is withdrawn from the position shown in FIG. 4 so as to allow the stopper 73 to move toward its lock position. However, the key-lock lever 60, which is being pressed against the positioning pin 31, cannot rotate in the clockwise direction, thereby preventing the stopper 73 from moving toward its lock position.

In this state, when the brake pedal 92 is pressed in order to release the positioning pin 31 from the parking position (P) after the engine is started, the solenoid 42 is turned off while receiving the signal from the sensor 92. In this off state of the solenoid 42, if the user moves the positioning pin 31 downwards while pressing the knob button 34, the key-lock lever 60 rotates in the clockwise direction as the result of the force of the helical torsion spring 62. At the same time, the shift lock lever 41 is rotated in the counterclockwise direction by the movement of the plunger 44 in the direction shown by the arrow A, whereby the lock portion 41a of the shift-lock lever 41 withdraws from the position immediately under the positioning pin 31. Consequently, the positioning pin 31 of the shift lever 30 can shift from the parking position (P) toward the running position, thereby allowing the vehicle to run. In this situation, the stopper 73 is allowed to move toward its lock position by the clockwise rotation of the key-lock lever 60 and the force of the tension spring 75, whereby the key rotor 72 is prevented from rotating from the on position (ON) toward the lock position (LOCK) during the running of the vehicle.

Accordingly, the key-lock lever 60, which can prevent the shift-lock lever 41 from rotating, allows the shift-lock lever 41 to be withdrawn from the position under the positioning pin 31 positioned at the parking position (P) only when the engine key is rotated toward the on position (ON) in the cylinder lock 70. Therefore, since the user cannot start the engine of the vehicle as long as the engine key is not in the cylinder lock 70, theft of the vehicle in a parking state can be avoided.

In the above-described driving state, in order to remove the engine key, first, the positioning pin 31 is moved from the running position toward the parking position (P) while the shift lever 30 is shifted. By this operation, the key-lock lever 60 is pressed by the positioning pin 31 and rotates in the counterclockwise direction, whereby the projection 60c abuts the contact point of the microswitch 63. As a result, the solenoid 42 is turned on while causing the plunger 44 to enter the solenoid 44, whereby the shift-lock lever 41 rotates in the clockwise direction to a point under the positioning pin 31 positioned at the parking position (P). At the same time, the stopper 73 is pulled by the key-lock lever 60 through the cable 80 so as to be at its unlock position, whereby it becomes possible for the key rotor 72 to rotate toward the lock position (LOCK). Finally, the engine key can be removed from the cylinder lock 70. After the removal of the engine key, even though the solenoid 42 is turned off while causing the plunger 44 to be extended, since the projection 60b of the key-lock lever 60 still abuts against the back side face 41c of the shift-lock lever 41, the shift-lock lever 41 can be prevented from rotating as described before.

What is claimed is:

1. A shift lever apparatus provided in a vehicle, comprising:

a positioning plate with a parking position and a running position;

a shift lever pivotally supported on a vehicle body;

a positioning pin arranged on said shift lever, said positioning pin being movable between the parking position and a running position;

a pin-lock member positionable at a pin-lock position and a pin-lock release position, said pin-lock position being set to restrict the movement of said positioning pin positioned at the parking position, said pin-lock release position being set to allow said positioning pin to move freely, said pin-lock member being under the positioning pin when in its pin-lock position;

a restrict member positionable at a restrict position at which the restrict member abuts against the pin-lock member to prevent said pin-lock member from moving from the pin-lock position toward the pin-lock release position, said restrict member being over the positioning pin when in its restrict position; and control means for positioning said pin-lock member at the pin-lock position and for positioning said restrict member at the restrict position when said positioning pin is positioned at the parking position.

2. A shift lever apparatus according to claim 1, wherein said restrict member is pivotally supported by a first shaft, is energized in a first direction by a first energizing member, and is pressed by said positioning pin while rotating in a second direction opposite to the first direction to be positioned at the restrict position when said positioning pin is positioned at the parking position, and said control means includes a switch part and an actuator, said switch part being turned on by said restrict member when said positioning pin moves from the running position toward the parking position and said restrict member is positioned at the restrict position, said actuator being connected to said pin-lock member and serving to position said pin-lock member at the pin-lock position when said switch part is turned on.

3. A shift lever apparatus according to claim 2, wherein said pin-lock member has a side face, said side face for abutting against said restrict member when said pin-lock member is at the pin-lock position, and said restrict member has a first side portion and a second side portion, said first side portion being pressed by and being positioned over said positioning pin when the positioning pin is positioned at the parking position, and said second side portion abutting against said side face of said pin-lock member to restrict the pin-lock member from moving toward the pin-lock release position when the vehicle is parked.

4. A shift lever apparatus according to claim 2, wherein said actuator has a solenoid and a plunger, said plunger being connected to said pin-lock member and exiting and entering said solenoid respectively when said solenoid is turned off and on, to energize said pin-lock member toward the pin-lock release position and the pin-lock position respectively, and said pin-lock member is pivotally supported by a second shaft so as to rotate in the first direction and to be positioned at the pin-lock release position when said solenoid is turned on to allow said plunger to exit and has an end portion, said end portion being located a distance apart from said second shaft and abutable against said positioning pin positioned at the parking position so as to prevent the positioning pin from moving.

5. A shift lever apparatus according to claim 4, wherein
said first energizing member has an energizing force which is larger than that of said solenoid.

6. A shift lever apparatus according to claim 4, wherein
said control means further has a release part and a brake part, said release part generating a turning-on signal and a turning-off signal according to the starting and stopping of an engine of the vehicle, said turning-on signal generated for turning on the solenoid when the start of the engine Is set and said turning-off signal generated for turning off the solenoid after the engine is started, and said brake part generating a signal to turn off said solenoid when a brake pedal is pressed under a condition in which the positioning pin is positioned at the parking position.

7. A shift lever apparatus according to claim 6, wherein
said release part has a rolling member, a stopper member and a second energizing member, and said control means has a connecting member,
said connecting member being tensioned and connected to the stopper member and the second side portion of the restrict member,
said second energizing member being provided between said stopper member and said restrict member for energizing the stopper member in a third direction in which the stopper member moves away from the restrict member,
said rolling member rotatable according to the setting of the start and the stop positions for the engine,
said stopper member movable between an unlock position and a lock position, said unlock position set to allow the rolling member to freely rotate, said lock position set to prevent the rolling member from rotating so as to prevent the setting of the start of the engine when the restrict member is positioned at the restrict release position.

8. A shift lever apparatus according to claim 7, wherein
the sum of the energizing forces of said first and second energizing members is smaller than the pressing force by which the positioning pin presses the restrict member.

9. A shift lever apparatus according to claim 3, wherein
said second side portion has a first projection and said restrict member has a second projection which abuts against the switch part to turn on the switch when the positioning pin is positioned at the parking position to rotate the restrict member.

* * * * *